(12) United States Patent
Kang et al.

(10) Patent No.: US 9,712,304 B2
(45) Date of Patent: Jul. 18, 2017

(54) METHOD FOR CONFIGURING REFERENCE SIGNAL FOR MULTI-ANTENNA-BASED BEAMFORMING IN WIRELESS COMMUNICATION SYSTEM AND DEVICE FOR SAME

(71) Applicant: LG ELECTRONICS INC., Seoul (KR)

(72) Inventors: Jiwon Kang, Seoul (KR); Kilbom Lee, Seoul (KR); Hyunsoo Ko, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/778,982

(22) PCT Filed: Apr. 30, 2014

(86) PCT No.: PCT/KR2014/003854
§ 371 (c)(1),
(2) Date: Sep. 21, 2015

(87) PCT Pub. No.: WO2014/185645
PCT Pub. Date: Nov. 20, 2014

(65) Prior Publication Data
US 2016/0050050 A1 Feb. 18, 2016

Related U.S. Application Data

(60) Provisional application No. 61/823,870, filed on May 15, 2013.

(51) Int. Cl.
*H04L 5/00* (2006.01)
*H04B 7/06* (2006.01)
*H04W 72/04* (2009.01)

(52) U.S. Cl.
CPC .......... *H04L 5/005* (2013.01); *H04B 7/0617* (2013.01); *H04W 72/046* (2013.01); *H04L 5/0023* (2013.01)

(58) Field of Classification Search
None
See application file for complete search history.

(56) References Cited

U.S. PATENT DOCUMENTS

2013/0244676 A1* 9/2013 Koivisto ............... H04L 5/0048
455/452.1
2014/0185530 A1* 7/2014 Kuchibhotla ....... H04W 76/023
370/329

FOREIGN PATENT DOCUMENTS

KR 10-2010-0091095 8/2010
KR 10-2010-0138261 12/2010
(Continued)

OTHER PUBLICATIONS

Yamindi, et al., "The Approach of the New Downlink Control Information Design for Transmission Mode 10," In: IEEE Wireless Telecommunications Symposium (WTS), Apr. 2013, 7 pages.
(Continued)

*Primary Examiner* — Hicham Foud
*Assistant Examiner* — Omeed D Rahgozar
(74) *Attorney, Agent, or Firm* — Lee Hong Degerman Kang & Waimey

(57) ABSTRACT

A method by which a base station transmits a reference signal to a terminal in a wireless communication system is disclosed. Particularly, the method comprises the steps of determining a reference signal resource interval expressed as a unit of one or more resource blocks (RBs), setting reference signal resources for a downlink bandwidth defined by a plurality of RBs, according to the reference signal resource interval, and transmitting the reference signal to the terminal by using the set reference signal resources, wherein the (Continued)

reference signal resource interval is determined on the basis of the number of reference signal antenna ports for which quasi co-location (QCL) can be assumed.

5 Claims, 15 Drawing Sheets

(56) References Cited

FOREIGN PATENT DOCUMENTS

| KR | 10-2011-0084594 | 7/2011 |
| KR | 10-2011-0108284 | 10/2011 |

OTHER PUBLICATIONS

PCT International Application No. PCT/KR2014/003854, Written Opinion of the International Searching Authority dated Aug. 6, 2014, 12 pages.

\* cited by examiner

E-UMTS (a) CONTROL-PLANE PROTOCOL STACK (b) USER-PLANE PROTOCOL STACK (a) CONVENTIONAL ANTENNA SYSTEM  (b) AAS

METHOD FOR CONFIGURING REFERENCE SIGNAL FOR MULTI-ANTENNA-BASED BEAMFORMING IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2014/003854, filed on Apr. 30, 2014, which claims the benefit of U.S. Provisional Application No. 61/823,870, filed on May 15, 2013, the contents of which are all hereby incorporated by reference herein in their entirety.

TECHNICAL FIELD

The present invention relates to a wireless communication system, and more particularly, to a method for configuring a reference signal for multi-antenna-based beamforming in a wireless communication system and a device for the same.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

Based on the aforementioned discussion, hereinafter, an object of the present invention is to provide a method for configuring a reference signal for multi-antenna-based beamforming in a wireless communication system and a device for the same.

Technical Solution

In one aspect of the present invention, a method for enabling a base station to transmit a reference signal to a user equipment in a wireless communication system comprises the steps of determining a reference signal resource interval expressed in a unit of one or more resource blocks (RBs); configuring reference signal resources for a downlink bandwidth defined by a plurality of RBs in accordance with the reference signal resource interval; and transmitting the reference signal to the user equipment by using the configured reference signal resources, wherein the reference signal resource interval is determined on the basis of the number of reference signal antenna ports, which enable quasi co-location (QCL) assumption.

Preferably, the step of configuring the reference signal resources includes determining an offset value indicating an index of a resource block in which the first reference signal resource is configured; and transmitting information on the offset value to the user equipment, wherein the offset value is based on at least one of cell ID and a subframe number to which the reference signal is transmitted.

More preferably, the step of configuring the reference signal resources includes configuring the reference signal resources in accordance with the following Equation A:

$$k = M \times m + O, \qquad \text{<Equation A>}$$

(where k is an index of the resource block in which the reference signal resource is configured, M is the reference signal resource interval, O represents the offset value, and m represents a factor indicating the number of times for configuration of the reference signal resources).

In the above Equation A, m has a value of 0 to $N_{RB}-1$, and $N_{RB}$ is a total number of times for configuration of the reference signal resource and is determined based on the downlink bandwidth. In more detail, $N_{RB}$ may be configured in accordance with $$N_{RB} = \lfloor N_{RB}^{DL} / M \rfloor$$

or $$N_{RB} = \lfloor N_{RB}^{DL} / M \rfloor + I\left(O + M \left\lfloor \frac{N_{RB}^{DL}}{M} \right\rfloor\right).$$

In this case, $N_{RB}^{DL}$ represents the downlink bandwidth. Also, I(x) represents a function, which has a value of 1 if x is smaller than $N_{RB}^{DL}$ and has a value of 0 if x is greater than $N_{RB}^{DL}$, and $N_{RB}^{DL}$ represents the downlink bandwidth.

Additionally, the method further comprises the step of transmitting information on the number of reference signal antenna ports, which enable the QCL assumption, to the user equipment. In this case, the reference signal antenna ports, which enable the QCL assumption, are regarded to be the same as one another in at least one of Doppler spread, Doppler shift, average delay and delay spread.

In another aspect of the present invention, a base station in a wireless communication system comprises a processor determining a reference signal resource interval expressed in a unit of one or more resource blocks (RBs) and an offset value indicating an index of a resource block in which a first reference signal resource is configured, and configuring reference signal resources for a downlink bandwidth defined by a plurality of RBs in accordance with the reference signal resource interval and the offset value; and a wireless communication module transmitting the reference signal to a user equipment by using the configured reference signal resources, wherein the processor determines the reference signal resource interval on the basis of the number of reference signal antenna ports, which enable quasi co-location (QCL) assumption.

Advantageous Effects

According to the embodiment of the present invention, for multi-antenna-based beamforming, a user equipment UE may efficiently and configure report a reference signal in a wireless communication system, whereby a base station may perform multi-antenna-based beamforming more efficiently.

It will be appreciated by persons skilled in the art that that the effects that can be achieved through the present invention are not limited to what has been particularly described hereinabove and other advantages of the present invention will be more clearly understood from the following detailed description.

BEST MODE FOR CARRYING OUT THE INVENTION

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 1:
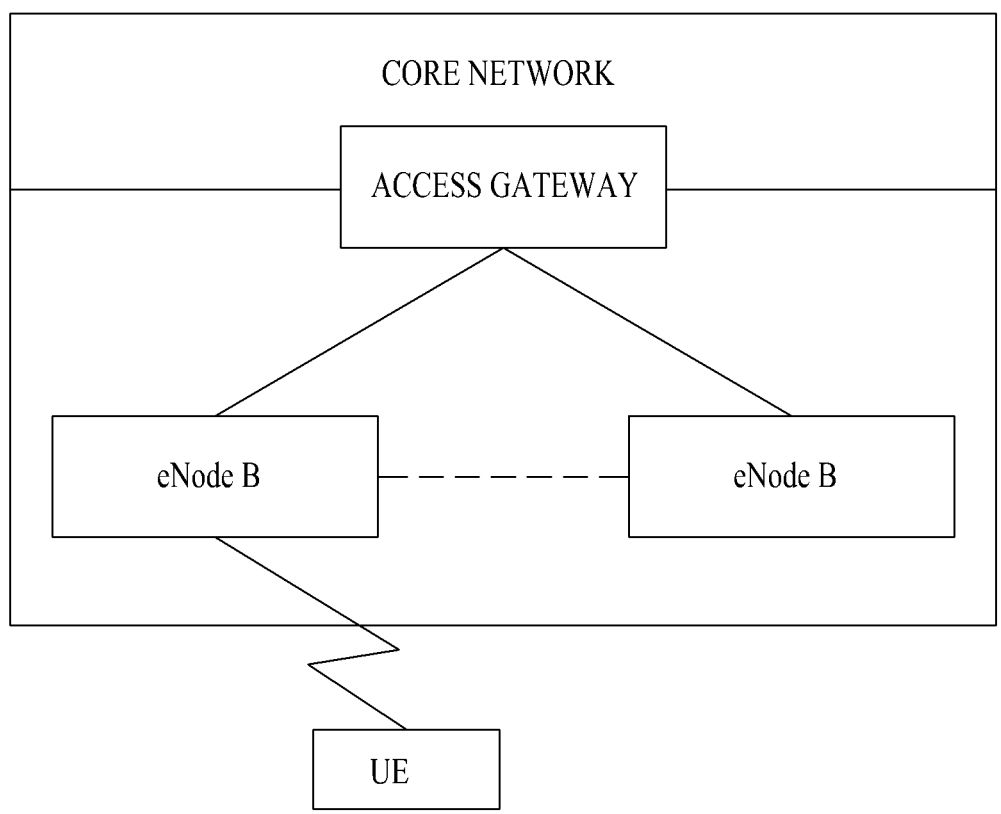
FIG. 1 illustrates a configuration of an Evolved Universal Mobile Telecommunications System (E-UMTS) network as an example of a wireless communication system.
Figure 2:
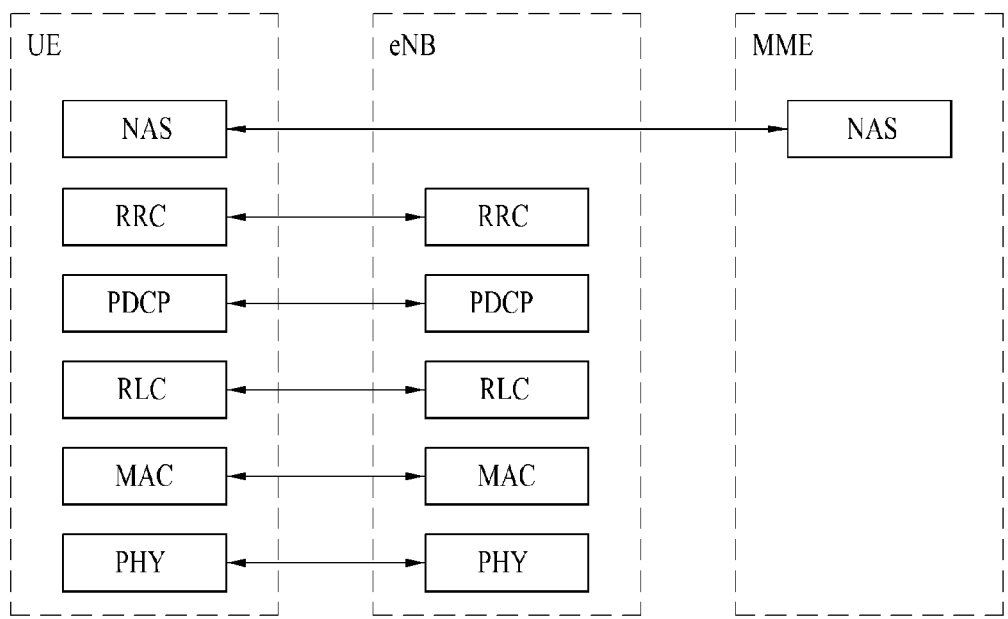
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN)
Figure 2:
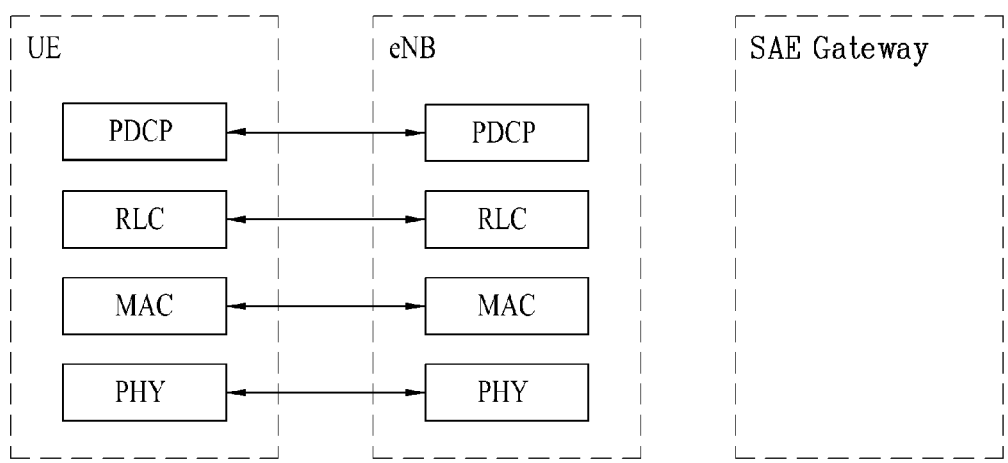

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
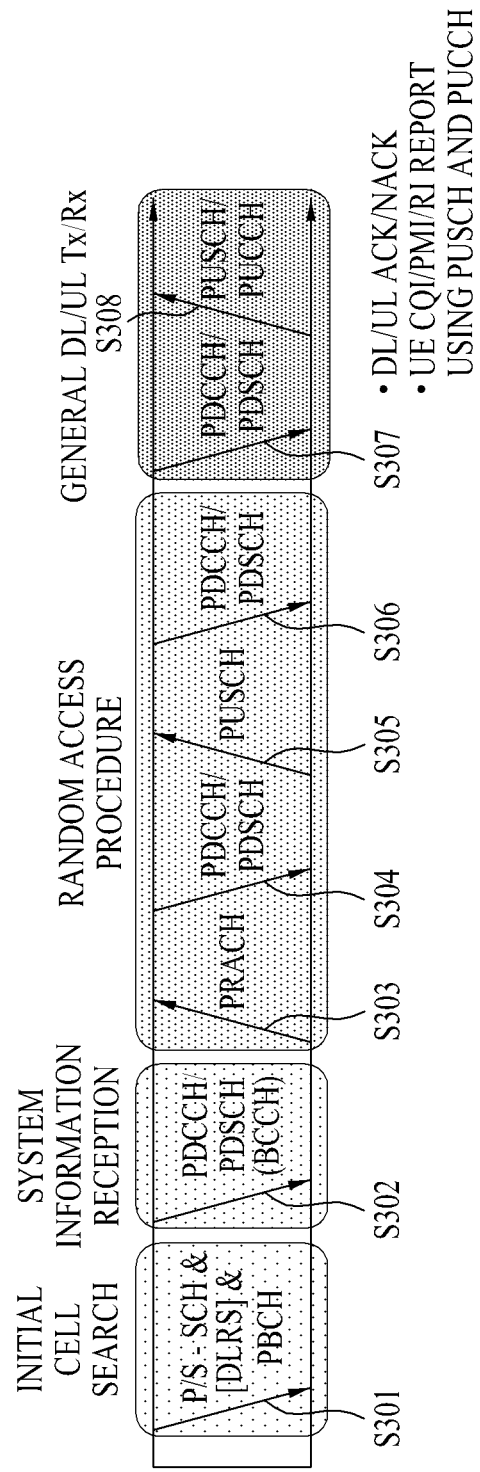
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
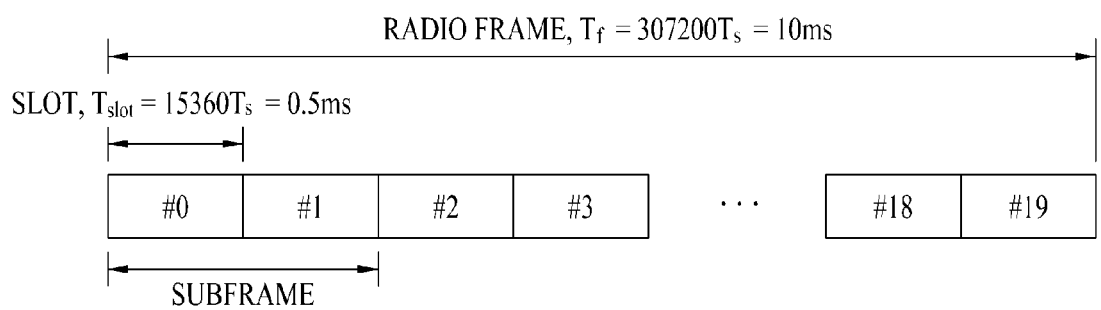
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
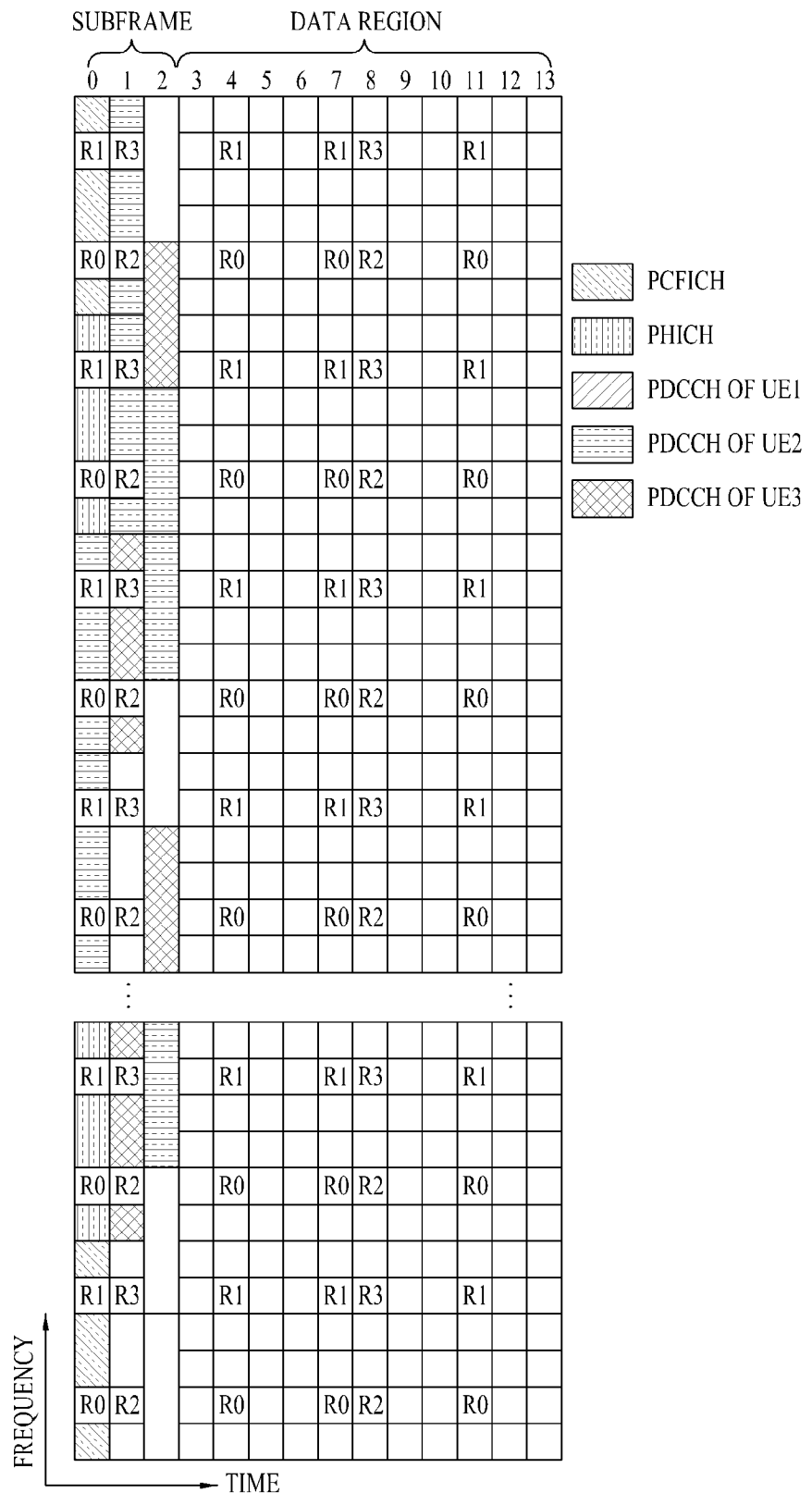
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
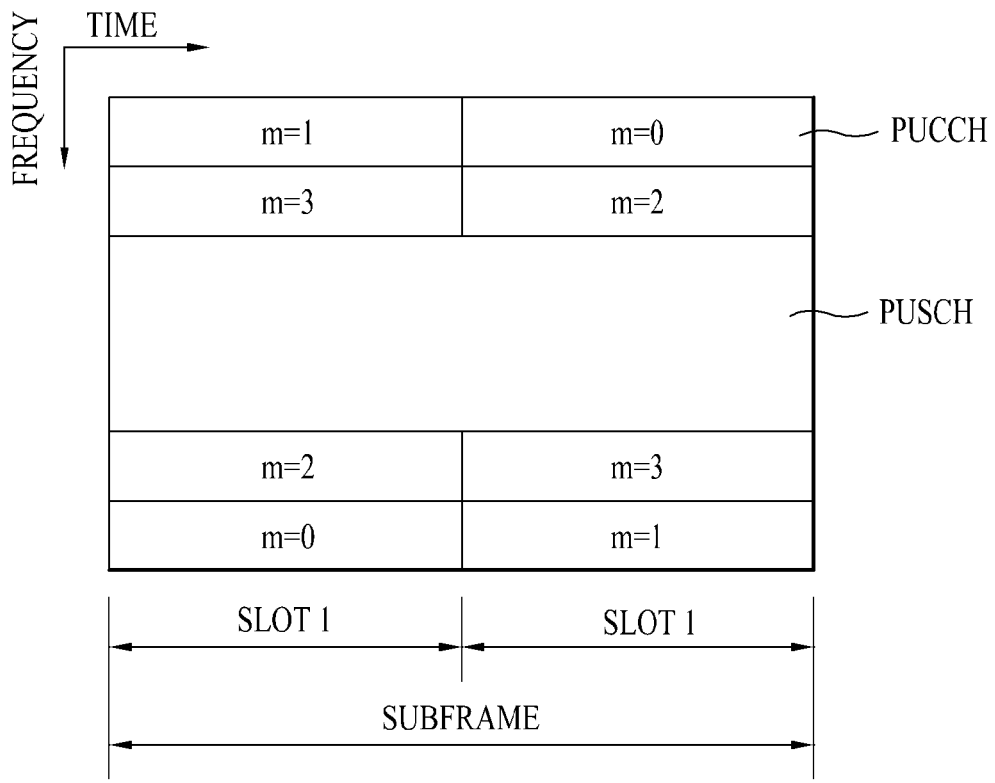
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Now a description will be given of a MIMO system. MIMO can increase the transmission and reception efficiency of data by using a plurality of Transmission (Tx) antennas and a plurality of Reception (Rx) antennas. That is, with the use of multiple antennas at a transmitter or a receiver, MIMO can increase capacity and improve performance in a wireless communication system. The term "MIMO" is interchangeable with 'multi-antenna'.

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
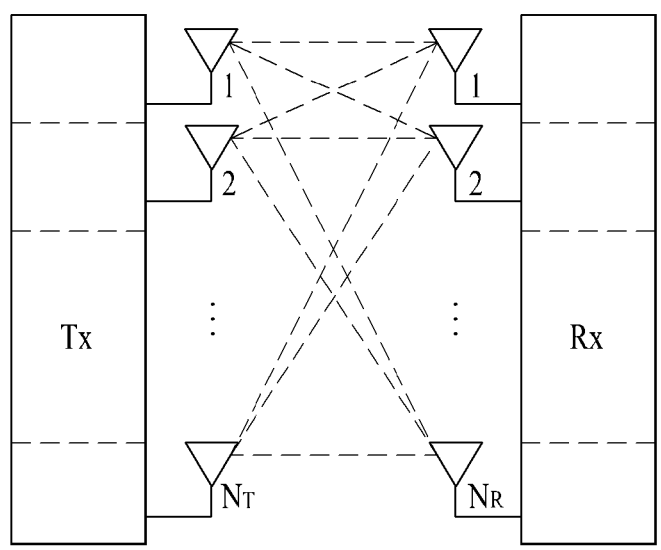
FIG. 7 illustrates a configuration of a general Multiple Input Multiple Output (MIMO) communication system.

FIG. 7 illustrates the configuration of a typical MIMO communication system.

Referring to FIG. 7, a transmitter has NT Tx antennas and a receiver has NR Rx antennas. The use of a plurality of antennas at both the transmitter and the receiver increases a theoretical channel transmission capacity, compared to the use of a plurality of antennas at only one of the transmitter and the receiver. The channel transmission capacity increases in proportion to the number of antennas. Therefore, transmission rate and frequency efficiency are increased. Given a maximum transmission rate Ro that may be achieved with a single antenna, the transmission rate may be increased, in theory, to the product of Ro and a transmission rate increase rate Ri in the case of multiple antennas. Ri is the smaller value between NT and NR.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards such as standards for 3G mobile communications, future-generation Wireless Local Area Network (WLAN), etc.

Concerning the research trend of MIMO up to now, active studies are underway in many aspects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with NT Tx antennas and NR Rx antennas as illustrated in FIG. 7 will be described in detail through mathematical modeling. Regarding a transmission signal, up to NT pieces of information can be transmitted through the NT Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector ŝ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{x_T}$ may be generated by multiplying the transmission power-controlled information vectors by a weight matrix W. The weight matrix W functions to appropriately distribute the transmission information to the Tx antennas according to transmission channel states, etc. These NT transmission signals $x_1, x_2, \ldots, x_{N_T}$ are represented as a vector X, which may be determined by [Equation 5]. Herein, $w_{ij}$ denotes a weight between a jth piece of information and an ith Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

It is expected that the future-generation mobile communication standard, LTE-A will support Coordinated Multi-Point (CoMP) transmission in order to increase data rate, compared to the legacy LTE standard. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO characterized by data sharing, and CoMP-Coordinated Scheduling/Beamforming (CoMP-CS/CB).

In DL CoMP-JP, a UE may instantaneously receive data simultaneously from eNBs that perform CoMP transmission and may combine the received signals, thereby increasing reception performance (Joint Transmission (JT)). In addition, one of the eNBs participating in the CoMP transmission may transmit data to the UE at a specific time point (Dynamic Point Selection (DPS)).

In contrast, in downlink CoMP-CS/CB, a UE may receive data instantaneously from one eNB, that is, a serving eNB by beamforming In UL CoMP-JP, eNBs may receive a PUSCH signal from a UE at the same time (Joint Reception (JR)). In contrast, in UL CoMP-CS/CB, only one eNB receives a PUSCH from a UE. Herein, cooperative cells (or eNBs) may make a decision as to whether to use CoMP-CS/CB.

In the following description, channel state information (CSI) reporting is explained. First of all, two kinds of transmission schemes (i.e., open-loop MIMO operational without channel state information and closed-loop MIMO operational based on channel state information) exist in the current LTE standard. Especially, in the closed-loop MIMO, each of a user equipment and a base station can perform beamforming based on channel state information in order to obtain a multiplexing gain of MIMO antenna. In order to obtain the channel state information from the user equipment, the base station sends a reference signal to the user equipment and commands the user equipment to feed channel station information measured based on the reference signal back to the base station via PUCCH (physical uplink control channel) or PUSCH (physical uplink shared channel).

CSI can be mainly classified into three kinds of information including RI (rank indicator), PMI (precoding matrix index) and CQI (channel quality indication). First of all, as mentioned in the foregoing description, the RI indicates rank information of a channel and means the number streams a user equipment can receive via the same frequency-time resource. Since the RI is determined by long term fading, it is fed back to a base station by periods longer than those of the PMI or CQI in general.

Secondly, the PMI is the value reflecting spatial property of a channel and indicates a precoding matrix index of a base station preferred by a user equipment with reference to such a metric as SINR and the like. Finally, the CQI is a value indicating a strength of a channel and means a reception SINR normally obtainable when a base station uses PMI.

In such an advanced communication system such as the LTE-A standard, additional multi-user diversity can be additionally obtained using MU-MIMO (multi-user MIMO). Since interference between user equipments multiplexed together in antenna domain exists in MU-MIMO, a presence or non-presence of accuracy of CSI may considerably affect not only interference of a user equipment having reported the CSI but also interference of another multiplexed user equipment. Therefore, the MU-MINO requires a CSI reporting more accurate than that of SU-MIMO.

Hence, according to LTE-A standard, a final PMI is determined as designed in a manner of being divided into W1 and W2. In this case, the W1 is a long-term and/or wideband PMI and the W2 is a short-term and/or subband PMI.

For example of a hierarchical codebook transformation method of configuring one final PMI from the W1 and W2 informations, it is able to use a long-term covariance matrix of a channel, as shown in Equation 8.

$$W = \text{norm}(W1\,W2) \quad \text{[Equation 8]}$$

In Equation 8, the W2 is a short-term PMI and indicates a codeword of a codebook configured to reflect short-term channel information, the W indicates a codeword of a final codebook, and the norm(A) means a matrix in which a norm of each column of a matrix A is normalized into 1.

The existing structures of W1 and W2 can be expressed as Equation 9.

$$W1(i) = \begin{bmatrix} X_i & 0 \\ 0 & X_i \end{bmatrix}, \quad \text{[Equation 9]}$$

$$W2(j) = \overbrace{\begin{bmatrix} e_M^k & e_M^l & & e_M^m \\ \alpha_j e_m^k & \beta_j e_M^l & \cdots & \gamma_j e_M^m \end{bmatrix}}^{r\ columns}$$

where $X_i$ is Nt/2 by M matrix.
(if rank=r), where $1 \leq k,l,m \leq M$ and k,l,m are integer.

In Equation 9, the codeword structure uses cross polarized antenna. This structure is designed by reflecting channel correlation characteristics occurring if an inter-antenna space is very narrow (i.e., if a distance between neighboring antennas is equal to or smaller than a half of a signal wavelength). In case of the cross polarized antenna, antennas can be grouped into a horizontal antenna group and a vertical antenna group. Each of the antenna groups has the property of ULA (uniform linear array) antenna and the two antenna groups coexist.

Hence, inter-antenna correlation of each of the groups has the same property of linear phase increment, while inter-antenna group correlation has the property of phase rotation. Eventually, since a codebook presents a value of quantizing a channel, it is necessary to design the codebook by reflecting channel characteristics intact. For clarity of the following description, one example of Rank-1 codeword configured in the above-described hierarchy can be represented as Equation 10.

$$W1(i) * W2(j) = \begin{bmatrix} X_i(k) \\ \alpha_j X_i(k) \end{bmatrix} \quad \text{[Equation 10]}$$

In Equation 10, the codeword can be expressed as $N_T \times 1$ vectors and is hierarchized into an upper vector $X_i(k)$ and a lower vector $\alpha_j X_i(k)$. In this case, the NT indicates the number of transmitting antennas. And, the upper vector and the lower vector show the correlation property of the horizontal antenna group and the correlation property of the vertical antenna group, respectively. It is advantageous if the $X_i(k)$ is represented as a vector having the property of linear phase increment by reflecting the inter-antenna correlation property of each antenna group. For representative example, DFT matrix can be used as the $X_i(k)$.

In such an advanced communication system such as the LTE-A standard, additional multi-user diversity can be additionally obtained using MU-MIMO (multi-user MIMO). Since interference between user equipments multiplexed together in antenna domain exists in MU-MIMO, a presence or non-presence of accuracy of CSI may considerably affect not only interference of a user equipment having reported the CSI but also interference of another multiplexed user equipment. Therefore, the MU-MINO requires a CSI reporting more accurate than that of SU-MIMO.

Moreover, in case of CoMP JT, since several base stations coordinately sends the same data to a specific user equipment, a corresponding system can be theoretically regarded as an MIMO system in which antennas are geographically distributed. In particular, when MU-MIMO is operated in JT, channel state information of high accuracy is required to avoid interference between coordinately scheduled user equipments like the case of a single cell MU-MIMO. In case of CoMP CB, an elaborate channel state information is also required to avoid interference given to a serving cell by a neighbor cell. In order to increase accuracy of channel state information feedback in general, an additional channel state information feedback reporting is required and such reporting is transmitted to a base station on PUCCH or PUSCH.

Herein below, transmission modes for a DL data channel will be described. A current 3GPP LTE standard specification, 3GPP TS 36.213 defines DL data channel transmission modes as illustrated in [Table 1]. A DL data channel transmission mode is indicated to a UE by higher-layer signaling, that is, RRC signaling.

TABLE 1

| Transmission mode | DCI format | Transmission scheme of PDSCH corresponding to PDCCH |
|---|---|---|
| Mode 1 | DCI format 1A | Single-antenna port, port 0 |
|  | DCI format 1 | Single-antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Large delay CDD or Transmit diversity |
| Mode 4 | DCI format 1A | Transmit diversity |
|  | DCI format 2 | Closed-loop spatial multiplexing or Transmit diversity |
| Mode 5 | DCI format 1A | Transmit diversity |
|  | DCI format 1D | Multi-user MIMO |
| Mode 6 | DCI format 1A | Transmit diversity |
|  | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
|  | DCI format 1 | Single-antenna port, port 5 |
| Mode 8 | DCI format 1A | If the number of PBCH antenna ports is one, Single-antenna port, port 0 is used, otherwise Transmit diversity |
|  | DCI format 2B | Dual layer transmission, port 7 and 8 or single-antenna port, port 7 or 8 |
| Mode 9 | DCI format 1A | Non-MBSFN subframe: If the number of PBCH antenna ports is one. Single-antenna port, port 0 is used, otherwise Transmit diversity MBSFN subframe: Single-antenna port, port 7 |
|  | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2D | Up to 8 layer transmission, ports 7-14 or single-antenna port, port 7 or 8 |

Referring to Table 1, in the current 3GPP LTE standard document, a transmission mode, a DCI format corresponding to the transmission mode, that is, a transmission mode based DCI format is disclosed. Also, a DCI format 1A for a fall-back mode, which may be applied to each transmission mode, is defined. According to an operation example of the transmission mode, as a result of blind decoding for the PDCCH in Table 1, if a DCI format 1B is detected, the PDSCH is decoded on the assumption that the PDSCH is transmitted in accordance with a closed-loop spatial multiplexing scheme based on a single layer.

In [Table 1], Mode 10 is a DL data channel transmission mode for CoMP. For example, if the UE detects DCI format 2D by blind-decoding a PDCCH masked by a C-RNTI, the UE decodes a PDSCH, assuming that the PDSCH has been transmitted through antenna port 7 to antenna port 14, that is, based on DM-RSs by a multi-layer transmission scheme, or assuming that the PDSCH has been transmitted through a single antenna port, DM-RS antenna port 7 or 8.

On the other hand, as a result of blind decoding for the PDCCH, if the DCI format 1A is detected, the transmission mode is varied depending on whether the corresponding subframe is MBSFN subframe. For example, if the corresponding subframe is a non-MBSFN subframe, the PDSCH is decoded on the assumption that the PDSCH has been transmitted in accordance with CRS based single antenna transmission of an antenna port 0 or CRS based transmission diversity scheme. Also, if the corresponding subframe is an MBSFN subframe, the PDSCH may be decoded on the assumption that the PDSCH has been transmitted in accordance with DM-RS based single antenna transmission of antenna port 7.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 8:
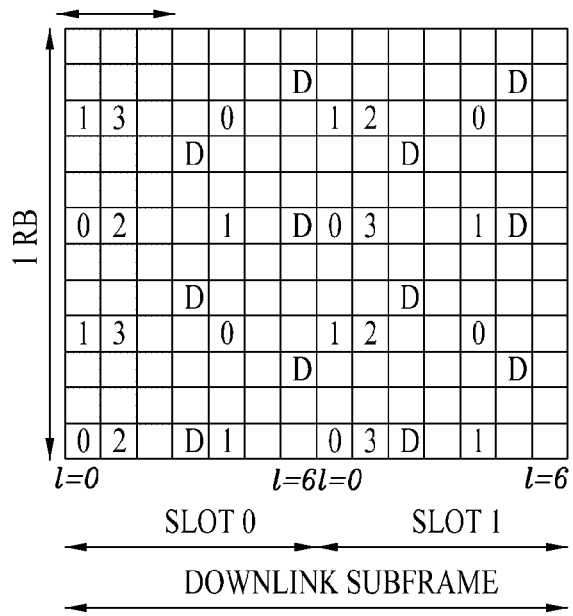
FIGS. 8 and 9 illustrate downlink Reference Signal (RS) configurations in an LTE system supporting downlink transmission through four antennas (4-Tx downlink transmission)
Figure 9:
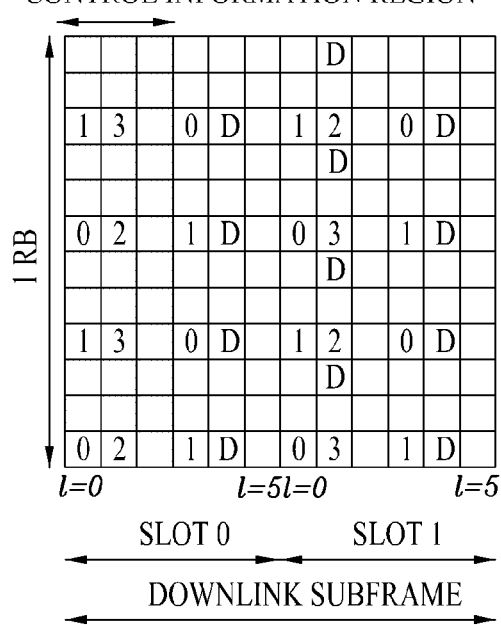

FIGS. 8 and 9 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 8 and 9, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 8 and 9, the DMRSs are transmitted through antenna port 5. 3GPP TS 36.211 defines DMRSs for a total of eight antenna ports, antenna port 7 to antenna port 14.

Figure 10:
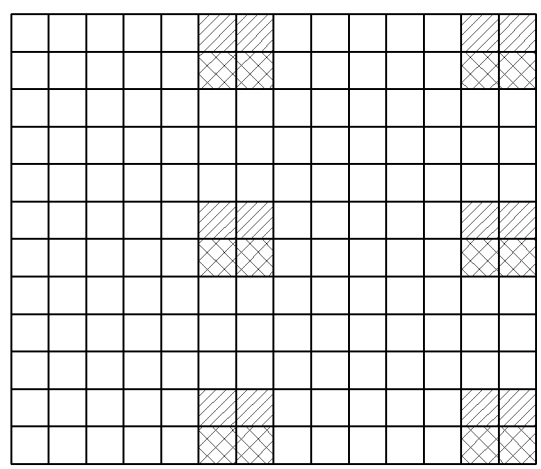
FIG. 10 illustrates an exemplary downlink Demodulation Reference Signal (DMRS) allocation defined in a current 3GPP standard specification.

FIG. 10 illustrates an exemplary DL DMRS allocation defined in a current 3GPP standard specification.

Referring to FIG. 10, DMRSs for antenna ports 7, 8, 11, and 13 are mapped using sequences for the respective antenna ports in a first DMRS group (DMRS Group 1), whereas DMRSs for antenna ports 9, 10, 12, and 14 are mapped using sequences for the respective antenna ports in a second DMRS group (DMRS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 2] and [Table 3] list CSI-RS configurations defined in the 3GPP standard. Specifically, [Table 2] lists CSI-RS configurations in the case of a normal CP and [Table 3] lists CSI-RS configurations in the case of an extended CP.

TABLE 2

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |

TABLE 2-continued

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 3

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
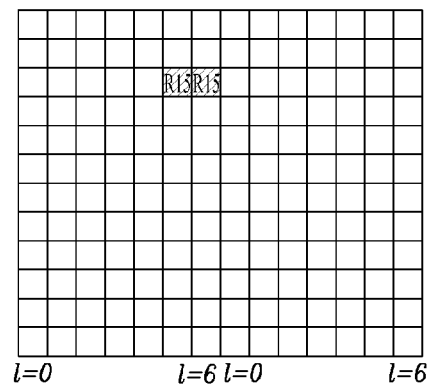
FIG. 11 illustrates Channel State Information-Reference Signal (CSI-RS) configuration #0 of downlink CSI-RS configurations defined in a current 3GPP standard specification.
Figure 11:
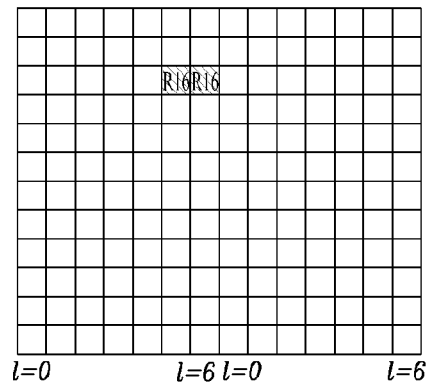
Figure 11:
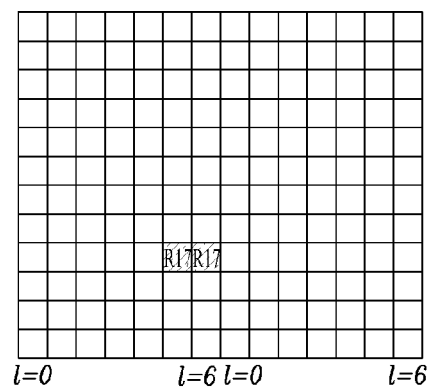
Figure 11:
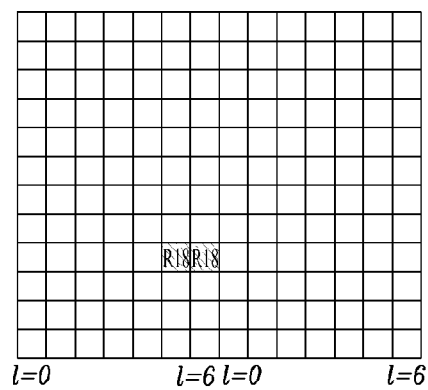
Figure 11:
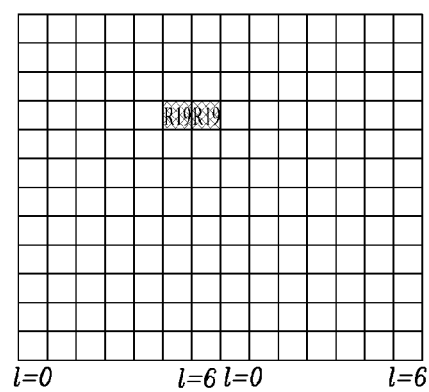
Figure 11:
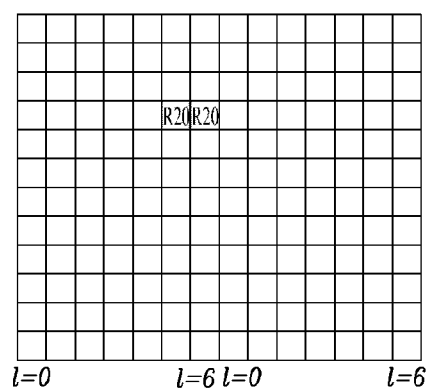
Figure 11:
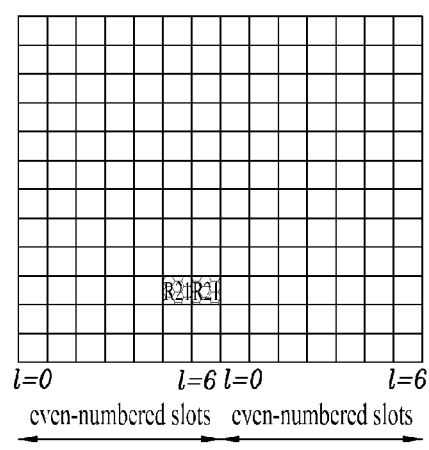
Figure 11:
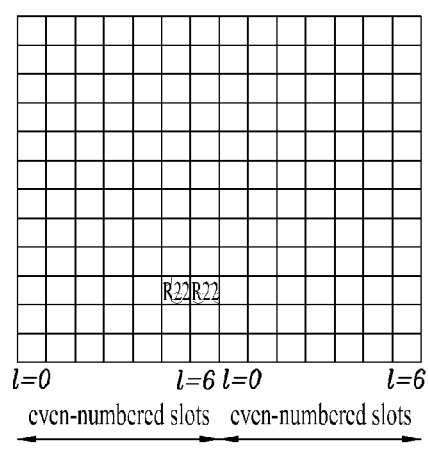

In [Table 2] and [Table 3], (k',l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$. [Table 4] lists CSI-RS subframe configurations defined in the 3GPP standard.

TABLE 4

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |

TABLE 4-continued

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 15-34 | 20 | $I_{CSI-RS}-15$ |
| 35-74 | 40 | $I_{CSI-RS}-35$ |
| 75-154 | 80 | $I_{CSI-RS}-75$ |

Meanwhile, information on a zero-power CSI-RS is currently configured through RRC layer signal. Particularly, ZP CSI-RS resource configuration is comprised of zeroTxPowerSubframeConfig and 16-bit size bitmap, that is, zeroTxPowerResourceConfigList. In this case, zeroTxPowerSubframeConfig indicates a transmission period of a corresponding ZP CSI-RS and subframe offset through a value of $I_{CSI-RS}$ corresponding to Table 4. Also, zeroTxPowerResourceConfigList is information indicating ZP CSI-RS configuration, and each element of the bitmap indicates configurations included in a column where the number of antenna ports for CSI-RS is four in Table 2 or 3. A general CSI-RS not the ZP CSI-RS is referred to as a non zero-power (NZP) CSI-RS.

Meanwhile, during application of the aforementioned CoMP scheme, the UE may receive a plurality of CSI-RS configurations through RRC layer signal. Each of the plurality of CSI-RS configurations is defined as in Table 5. Referring to Table 5, it is noted that information on CRS, which enables QCL (Quasi Co-Location) assumption, is included in each CSI-RS configuration.

TABLE 5

CSI-RS-ConfigNZP information elements

```
-- ASN1START
CSI-RS-ConfigNZP-r11 ::=    SEQUENCE {
    csi-RS-ConfigNZPId-r11      CSI-RS-ConfigNZPId-r11,
    antennaPortsCount-r11       ENUMERATED (an1, an2, an4, an8),
    resourceConfig-r11          INTEGER (0..31),
    subframeConfig-r11          INTEGER (0..154),
    scramblingIdentity-r11      INTEGER (0..503),
    qcl-CRS-Info-r11            SEQUENCE {
        qcl-ScramblingIdentity-r11    INTEGER (0..503),
        crs-PortsCount-r11            ENUMERATED (n1, n2, n4, spare1),
        mbsfn-SubframeConfigList-r11  CHOICE {
            release                       NULL,
            setup                         SEQUENCE {
                subframeConfigList            MBSFN-SubframeConfigList
            }
        }                                                          OPTIONAL   -- Need ON
    }                                                              OPTIONAL,  -- Need OR
    ...
}
-- ASN1STOP
```

The UE needs to calculate SINR as a factor required during CQI calculation. In this case, received power measurement (S-measure) of a desired signal may be performed using RS such as NZP CSI-RS, and for interference power measurement (I-measure or IM (Interference measurement)), a power of an interference signal obtained by removing the desired signal from the received signal is measured. Particularly, resources defined for interference power measurement will be referred to as CSI-IM (interference measurement) resources, and CSI-IM resources are defined as the aforementioned ZP CSI-RS resources. Also, report of the CSI or report of CQI is performed in a unit of a CSI process, and one CSI process is defined as one NZP CSI-RS resource and one CSI-IM resource and information on the CSI process is configured through RRC layer signal. Particularly, in the CoMP mode, a plurality of CSI processes may be configured for the UE.

Additionally, CSI measurement subframe sets $C_{CSI,0}$ and $C_{CSI,1}$ may be configured by higher-layer signaling and the subframes of each subframe set are different from the subframes of the other subframe set. In this case, the UE may perform S-measure in an RS such as a CSI-RS without any specific subframe constraint. However, the UE should calculate CQIs separately for the CSI measurement subframe sets $C_{SCI,0}$ and $C_{CSI,1}$ through separate I-measures in the CSI measurement subframe sets $C_{CSI,0}$ and $C_{CSI,1}$.

Now a description will be given of Quasi Co-Location (QCL).

If one antenna port is quasi co-located with another antenna port, this means that a UE may assume that the large-scale properties of a signal received from one of the antenna ports (or a radio channel corresponding to the antenna port) are wholly or partially identical to those of a signal received from the other antenna port (or a radio channel corresponding to the antenna port). The large-scale properties may include Doppler spread, Doppler shift, timing offset-related average delay, delay spread, average gain, etc.

According to the definition of QCL, the UE may not assume that antenna ports that are not quasi co-located with each other have the same large-scaled properties. Therefore, the UE should perform a tracking procedure independently for the respective antenna ports in order to the frequency offsets and timing offsets of the antenna ports.

On the other hand, the UE may perform the following operations regarding quasi co-located antenna ports.

1) The UE may apply the estimates of a radio channel corresponding to a specific antenna port in power-delay profile, delay spread, Doppler spectrum, and Doppler spread to Wiener filter parameters used in channel estimation of a radio channel corresponding another antenna port quasi co-located with the specific antenna port.

2) The UE may acquire time synchronization and frequency synchronization of the specific antenna port to the quasi co-located antenna port.

3) Finally, the UE may calculate the average of Reference Signal Received Power (RSRP) measurements of the quasi co-located antenna ports to be an average gain.

For example, it is assumed that upon receipt of DM-RS-based DL data channel scheduling information, for example, DCI format 2C on a PDCCH (or an Enhanced PDCCH (E-PDCCH)), the UE performs channel estimation on a PDSCH using a DM-RS sequence indicated by the scheduling information and then demodulates data.

In this case, if an antenna port configured for a DM-RS used in DL data channel estimation is quasi co-located with an antenna port for an antenna port configured for a CRS of a serving cell, the UE may use estimated large-scale properties of a radio channel corresponding to the CRS antenna port in channel estimation of a radio channel corresponding to the DM-RS antenna port, thereby increasing the reception performance of the DM-RS-based DL data channel.

Likewise, if the DM-RS antenna port for DL data channel estimation is quasi co-located with the CSI-RS antenna port of the serving cell, the UE may use estimated large-scale properties of the radio channel corresponding to the CSI-RS antenna port in channel estimation of the radio channel corresponding to the DM-RS antenna port, thereby increasing the reception performance of the DM-RS-based DL data channel.

In LTE, it is regulated that when a DL signal is transmitted in Mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with respect to large-scale properties except average gain. This means that the same node transmits a physical channel and signals. On the other hand, QCL type B is defined such that up to four QCL modes are configured for each UE by a higher-layer message to enable CoMP transmission such as DPS or JT and a QCL mode to be used for DL signal transmission is indicated to the UE dynamically by DCI.

DPS transmission in the case of QCL type B will be described in greater detail.

If node #1 having N1 antenna ports transmits CSI-RS resource #1 and node #2 having N2 antenna ports transmits CSI-RS resource #2, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within the common overage of node #1 and node #2 by a higher-layer signal.

Then, the eNB may perform DPS by configuring QCL mode parameter set #1 for the UE when transmitting data (i.e. a PDSCH) to the UE through node #1 and QCL mode parameter set #2 for the UE when transmitting data to the UE through node #2 by DCI. If QCL mode parameter set #1 is configured for the UE, the UE may assume that CSI-RS resource #1 is quasi co-located with a DM-RS and if QCL mode parameter set #2 is configured for the UE, the UE may assume that CSI-RS resource #2 is quasi co-located with the DM-RS.

An Active Antenna System (AAS) and Three-Dimensional (3D) beamforming will be described below.

In a legacy cellular system, an eNB reduces ICI and increases the throughput of UEs within a cell, for example, SINRs at the UEs by mechanical tilting or electrical tilting, which will be described below in greater detail.

Figure 12:
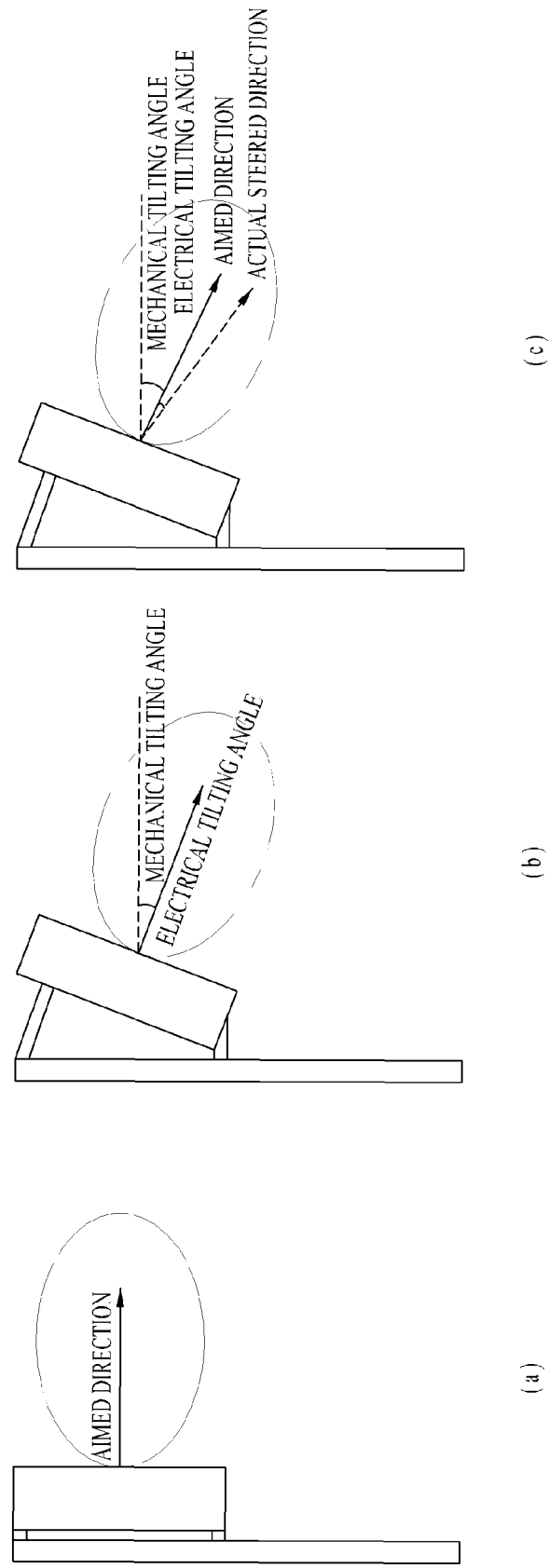
FIG. 12 illustrates antenna tilting schemes.

FIG. 12 illustrates antenna tilting schemes. Specifically, FIG. 12(a) illustrates an antenna configuration to which antenna tilting is not applied, FIG. 12(b) illustrates an antenna configuration to which mechanical tilting is applied, and FIG. 12(c) illustrates an antenna configuration to which both mechanical tilting and electrical titling are applied.

A comparison between FIGS. 12(a) and 12(b) reveals that mechanical tilting suffers from a fixed beam direction at initial antenna installation as illustrated in FIG. 12(b). On the other hand, electrical tilting allows only a very restrictive vertical beamforming due to cell-fixed tilting, despite the advantage of a tilting angle changeable through an internal phase shifter as illustrated in FIG. 12(c).

Figure 13:
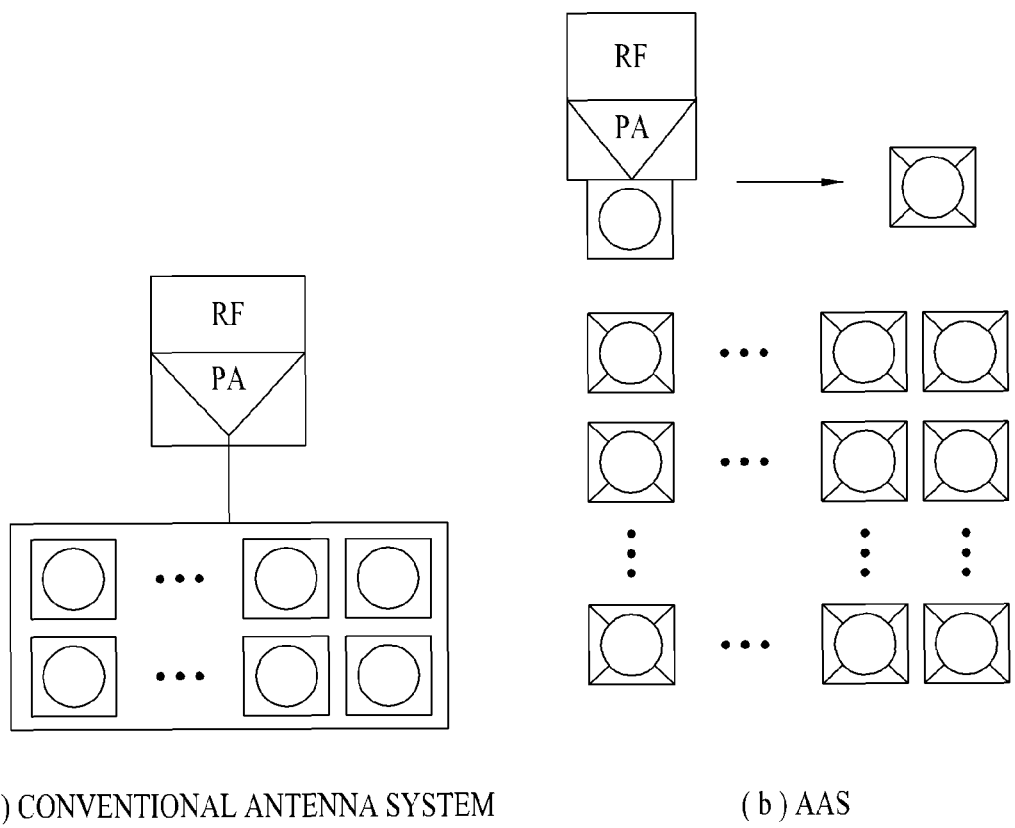
FIG. 13 is a view comparing an antenna system of the related art with an Active Antenna System (AAS)

FIG. 13 is a view comparing an antenna system of the related art with an AAS. Specifically, FIG. 13(a) illustrates the antenna system of the related art and FIG. 13(b) illustrates the AAS.

Referring to FIG. 13, as compared to the antenna system of the related art, each of a plurality of antenna modules includes a Radio Frequency (RF) module such as a Power Amplifier (PA), that is, an active device in the AAS. Thus, the AAS may control the power and phase on an antenna module basis.

In general, a linear array antenna (i.e. a one-dimensional array antenna) such as a ULA is considered as a MIMO antenna structure. A beam that may be formed by the one-dimensional array antenna exists on a Two-Dimensional (2D) plane. The same thing applies to a Passive Antenna System (PAS)-based MIMO structure. Although a PAS-based eNB has vertical antennas and horizontal antennas, the vertical antennas may not form a beam in a vertical direction and may allow only the afore-described mechanical tilting because the vertical antennas are in one RF module.

However, as the antenna structure of an eNB has evolved to an AAS, RF modules are configured independently even for vertical antennas. Consequently, vertical beamforming as well as horizontal beamforming is possible. This is called elevation beamforming.

The elevation beamforming may also be referred to as 3D beamforming in that available beams may be formed in a 3D space along the vertical and horizontal directions. That is, the evolution of a one-dimensional array antenna structure to a 2D array antenna structure enables 3D beamforming 3D beamforming is not possible only when an antenna array is planar. Rather, 3D beamforming is possible even in a ring-shaped 3D array structure. A feature of 3D beamforming lies in that a MIMO process takes place in a 3D space in view of various antenna layouts other than existing one-dimensional antenna structures.

Figure 14:
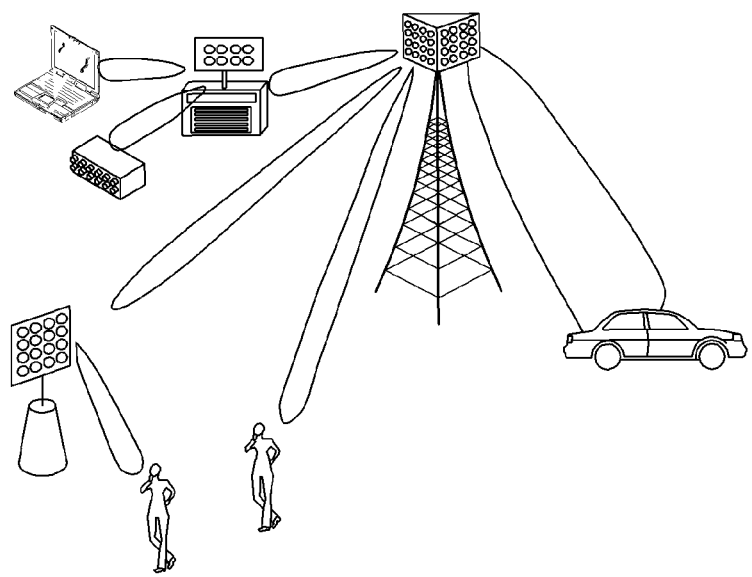
FIG. 14 illustrates an exemplary AAS-based User Equipment (UE)-specific beamforming.

FIG. 14 illustrates an exemplary UE-specific beamforming in an AAS. Referring to FIG. 14, even though a UE moves forward or backward from an eNB as well as to the left and right of the eNB, a beam may be formed toward the UE by 3D beamforming. Therefore, higher freedom is given to UE-specific beamforming Further, an outdoor to outdoor environment where an outdoor eNB transmits a signal to an outdoor UE, an Outdoor to Indoor (O2I) environment where an outdoor eNB transmits a signal to an indoor UE, and an indoor to indoor environment (an indoor hotspot) where an indoor eNB transmits a signal to an indoor UE may be considered as transmission environments using an AAS-based 2D array antenna structure.

Figure 15:
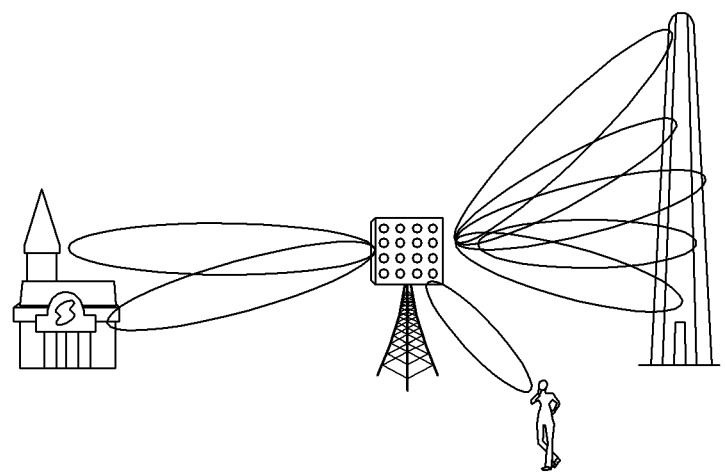
FIG. 15 illustrates an AAS-based three-dimensional beam transmission scenario.

FIG. 15 illustrates an AAS-based 3D beam transmission scenario.

Referring to FIG. 15, an eNB needs to consider vertical beam steering based on various UE heights in relation to building heights as well as UE-specific horizontal beam steering in a real cell environment where there are multiple buildings in a cell. Considering this cell environment, very different channel characteristics from those of an existing wireless channel environment, for example, shadowing/path loss changes according to different heights, varying fading characteristics, etc. need to be reflected.

In other words, 3D beamforming is an evolution of horizontal-only beamforming based on an existing linear one-dimensional array antenna structure. 3D beamforming refers to a MIMO processing scheme performed by extending to or combining with elevation beamforming or vertical beamforming using a multi-dimensional array antenna structure such as a planar array.

The massive antenna array may have one or more of the following properties. That is, the massive antenna array may be arranged on a two-dimensional plane or three-dimensional space, ii) the number of logical or physical antennas is 8 or more (in this case, the logical antenna may be expressed as antenna ports), and iii) each antenna may be comprised of AAS. However, definition of the massive antenna array is not limited to this configuration.

In the present invention, a method for configuring a reference signal for supporting the massive antenna array will be described. For convenience of description, it is assumed that the reference signal is the CSI-RS. However, the reference signal is not limited to the CSI-RS.

As described above, the CSI-RS defined in the LTE system may be used as resources defined for CSI (channel state information) measurement in various manners as follows.

1. Generally, the UE may measure CSI such as PMI, CQI, and RI from the NZP (non-zero power) CSI-RS resources and feed the measured CSI back.

2. Also, the UE may configure NZP CSI-RS resources transmitted from an interference node as ZP CSI-RS resources and take an action for mitigating interference on a physical channel.

3. Additionally, the UE may measure the amount of interference required for CQI calculation from interference measurement (IM) resources comprised of ZP CSI-RS resources.

In addition to the examples of 1 to 3, discussion to define CSI-RS based RSRP (RS received power)/RSRQ (RS received quality), which may be used during handover or cell selection or cell reselection, is ongoing.

Figure 16:
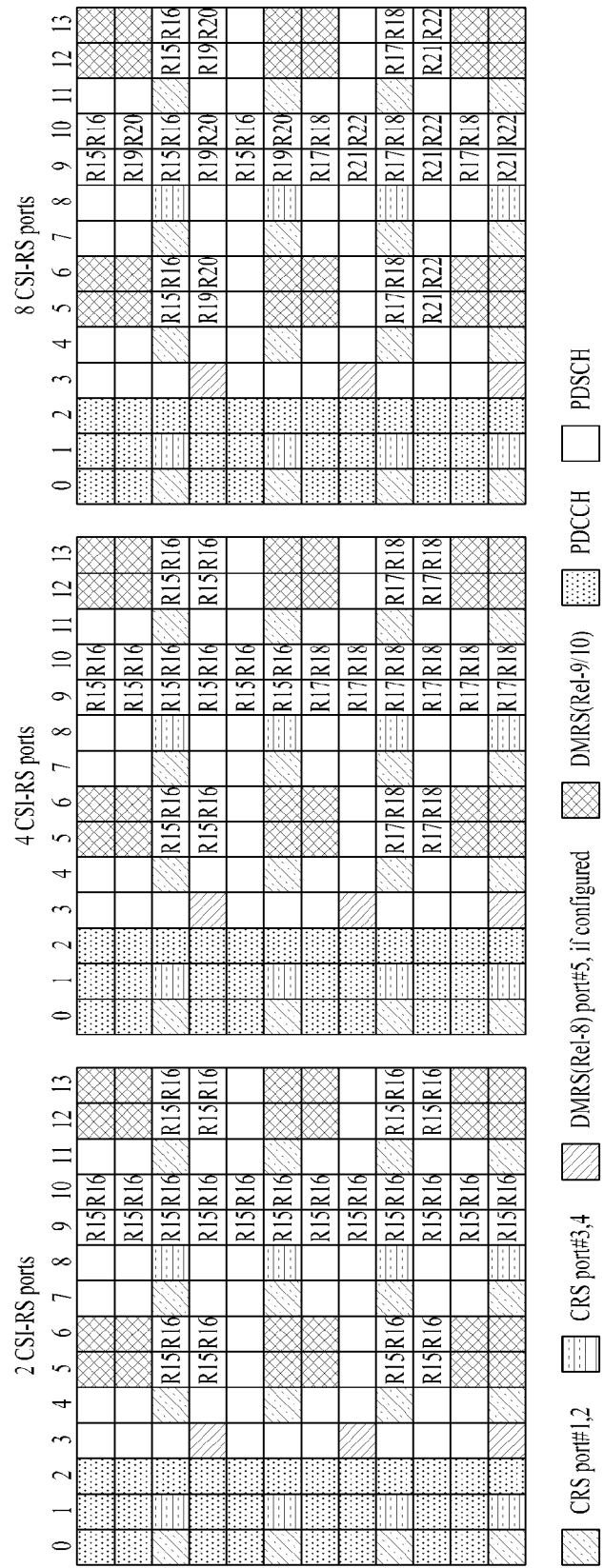
FIG. 16 is a diagram illustrating an example that reference signal sources are configured in an LTE system of the related art.

As described above, the CSI-RS is transmitted by being mapped into one or more resource elements REs previously defined for each resource block (RB) with respect to the full system bandwidth. FIG. 16 illustrates an example that reference signal resources are configured in the LTE system of the related art. Particularly, FIG. 16 illustrates each of examples of two antenna ports, four antenna ports and eight antenna ports.

In a 3D beamforming or massive MIMO environment, several tens of antennas or several hundreds of antennas may be installed in the base station, and the UE should estimate a channel of each antenna to obtain sufficient beamforming gain from the antennas. Consequently, since the number of CSI-RS antenna ports transmitted from the base station should be increased considerably, the following three methods may be considered to transmit the CSI-RS through several tens of CSI-RS antenna ports to several hundreds of CSI-RS antenna ports.

A) As a method for configuring multiple CSI-RS resources, base station antennas are grouped into a plurality of sub-arrays to transmit one CSI-RS resource per sub-array.

B) As a method for increasing the number of maximum antenna ports defined in one CSI-RS resource, the number of maximum antenna ports included in a single CSI-RS resource is increased to 9 or more. In this case, antenna ports starting from #23 may be defined additionally in the LTE system.

C) Finally, a method for newly defining a reference signal for channel estimation for a massive antenna array may be considered.

Even though any one of the above methods is used, if the number of CSI-RS antenna ports transmitted from a single base station is increased, a problem may occur in that CSI-RS overhead is increased. The present invention suggests a method for defining CSI-RS resources to have low CSI-RS overhead while conventional CSI-RS resources are being used as much as possible. Particularly, the present invention is suitable for a line of sight (LoS) environment of low delay spread.

In the first embodiment of the present invention, the CSI-RS pattern within one (1) RB is maintained, and RS resource transmitted from one of M number of RBs is newly defined. That is, RS resource is transmitted from the kth RB only of the M number of RBs, and k may be determined as expressed by the following Equation 11.

$$k = M \times m + O \qquad \text{[Equation 8]}$$

In the Equation 11, m has a value of 0 to $N_{RB}-1$, and O is an offset value which is an integer of one of 0 to M−1.

Figure 17:
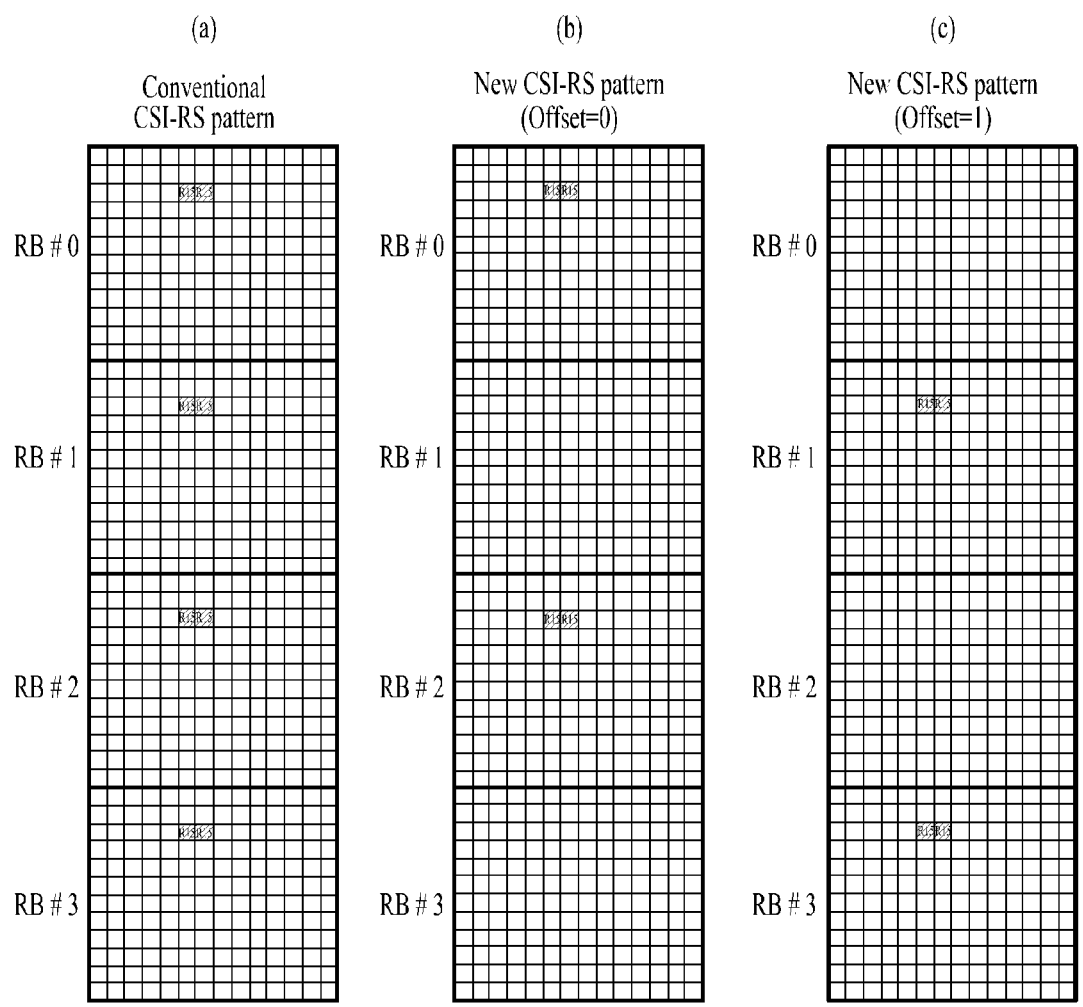
FIG. 17 is a diagram illustrating an example that CSI-RS resources are configured in accordance with the embodiment of the present invention.

FIG. 17 is a diagram illustrating an example that CSI-RS resources are configured in accordance with the embodiment of the present invention. Particularly, (a) of FIG. 17 illustrates the conventional CSI-RS pattern, and (b) and (c) of FIG. 17 illustrate that M is 2 and values of O are 0 and 1, respectively.

Referring to (a) of FIG. 17, it is noted that CSI-RS resources are configured in each of RB #0 to RB #3. Referring to (b) and (c) of FIG. 17, it is noted that one CSI-RS resource is configured if M is 2, that is, per 2RBs. Moreover, it is noted that the value of O is 0 and CSI-RS resources are configured in RB #0 and RB #2 in (b) of FIG. 17, and that the value of O is 1 and CSI-RS resources are configured in RB #1 and RB #3 in (c) of FIG. 17.

Meanwhile, $N_{RB}$ corresponding to a range of the value of m may be determined in accordance with the following Equation 12 or 13. In the Equations 12 and 13, $N_{RB}^{DL}$ means the number of RBs corresponding to a downlink bandwidth.

$$N_{RB} = \lfloor N_{RB}^{DL}/M \rfloor \qquad \text{[Equation 12]}$$

$$N_{RB} = \lfloor N_{RB}^{DL}/M \rfloor + I\left(O + M\left\lfloor \frac{N_{RB}^{DL}}{M} \right\rfloor\right)$$

In the Equation 13, I(x) represents a function, which has 1 if x is smaller than $N_{RB}^{DL}$ and has 0 if x is greater than $N_{RB}^{DL}$.

In more detail, the Equation 12 corresponds to a case where the CSI-RS is transmitted from $\lfloor N_{RB}^{DL}/M \rfloor -1$ number of RBs equally for all the offset values O. In this case, RB to which the CSI-RS is not transmitted may always exist regardless of the value of O in the system bandwidth in accordance with a relation between the values of M and $N_{RB}^{DL}$. Also, according to the Equation 13, if the CSI-RSs corresponding to all the offset values O are combined with one another, CSI-RS transmission is performed at a full downlink bandwidth from 0 to $N_{RB}^{DL}-1$ but the number of RBs to which the CSI-RS is transmitted may be varied depending on each value of O.

Next, the value of M which is a unit of RB, in which the CSI-RS pattern is defined, that is, CSI-RS interval, may be fixed using a predetermined value in the system. Also, a value varied semi-statically may be used in accordance with network configuration included in system information or RRC signaling. Additionally, the value of M may be determined adaptively in accordance with the number of reference signals that enables QCL assumption in one transmission point. Particularly, if the value of M is defined adaptively, the value of M may be increased as the number of antennas transmitted from one transmission point is increased, whereby overhead may be minimized. Alternatively, the value of M may be configured implicitly by types of the base stations, transmission power, etc. For example, in case of a small cell base station of which transmission power is relatively low, for example, a pico cell or a femto cell, the transmission power and the value of M may be mapped implicitly such that the value of M is set to 2.

Meanwhile, although the offset value O may be signaled through higher layer or physical layer message, the offset value may be determined implicitly through at least one of physical cell ID $N_{ID}^{cell}$, reference signal ID $N_{ID}^{CSI}$ applied during CSI-RS sequence, and a subframe number. Particularly, if the offset value is based on the subframe number, the offset value O may be varied per CSI-RS transmission subframe.

Additionally, whether the conventional CSI-RS pattern transmitted from a full bandwidth or a low density CSI-RS pattern according to the present invention is applied may be signaled through a higher layer or physical layer message, or may be determined implicitly by the number of antenna ports, which enables QCL assumption. For example, if the number of antenna ports, which enables QCL assumption, is a threshold value or more, the low density CSI-RS pattern according to the present invention is applied. Of course, the value of M which is the CSI-RS spacing may also be determined in accordance with the number of antenna ports, which enables QCL assumption.

QCL assumption may be determined in such a manner that the base station notifies the UE of predetermined information explicitly or implicitly. For example, an indicator as to whether QCL may be performed among the plurality of NZP CSI-RS resources or CSI processes may be signaled, or information as to NZP CSI-RS resources that enable QCL assumption may be signaled. Alternatively, the UE may regard that all of a plurality of NZP CSI-RS resources existing within a single CSI process enable QCL assumption. In this case, the base station may be restricted to configure the NZP CSI-RS resources, which enable QCL assumption, in a single CSI process.

Alternatively, the UE may actively determine whether QCL assumption is available between reference signal patterns. For example, the UE detects each received timing offset of the reference signal patterns to determine whether QCL assumption is available. That is, if received timing offset difference is within a threshold value, the UE determines that the corresponding signal patterns enable QCL assumption. For another example, QCL assumption may be determined on the basis of properties (for example, Doppler spread, delay spread, etc.) of channels estimated by each reference signal pattern. That is, if the estimated channel properties are similar to one another, the UE determines that the corresponding reference signal patterns enable QCL assumption.

Meanwhile, whether the offset value O and the low density CSI-RS pattern according to the present invention are applied may be signaled through a single message. For example, if the value of M which is the CSI-RS spacing is 2, whether the offset value O and the low density CSI-RS pattern according to the present invention are applied may be signaled through a 2-bit indicator as illustrated in Table 6 below.

TABLE 6

| Message = 00 | M = 1 (Legacy CSI-RS pattern) |
| Message = 01 | M = 2, O = 0 |
| Message = 10 | M = 2, O = 1 |

Although the low density CSI-RS pattern suggested in the present invention is intended for 3D MIMO or massive MIMO environment, the low density CSI-RS pattern suggested in the present invention may be used even in an environment where cell coverage is small and delay spread is low, such as a small cell environment.

Figure 18:
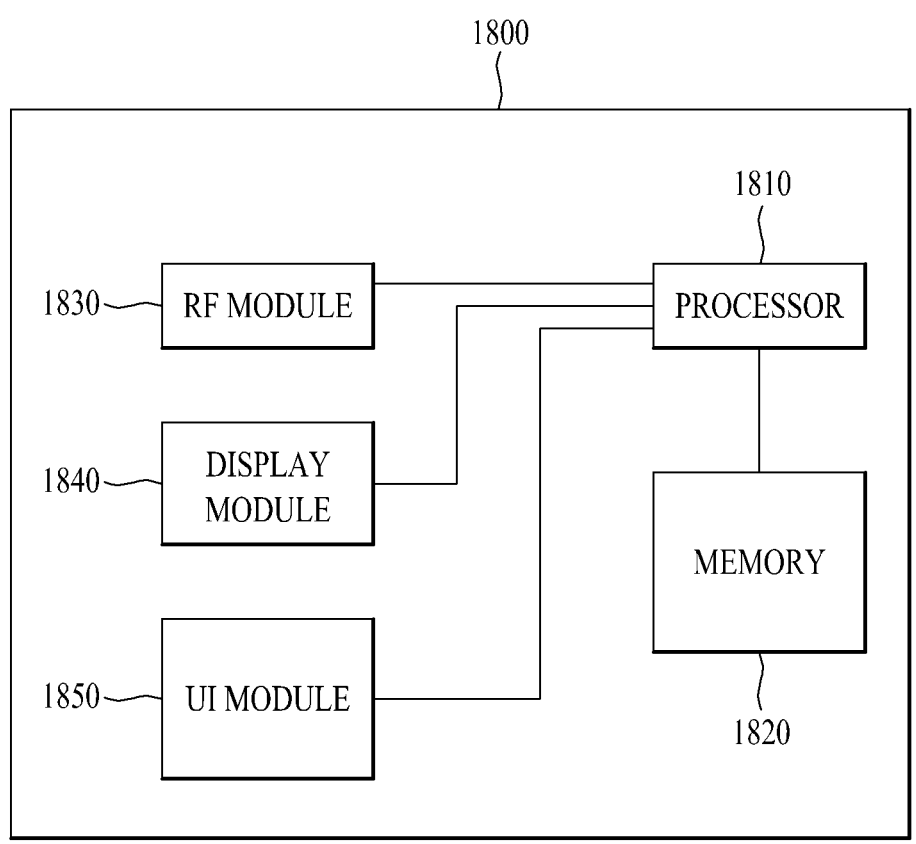
FIG. 18 is a block diagram of a communication apparatus according to an embodiment of the present invention.

FIG. 18 is a block diagram of a communication apparatus according to an embodiment of the present invention.

Referring to FIG. 18, a communication apparatus 1800 includes a processor 1810, a memory 1820, an RF module 1830, a display module 1840, and a User Interface (UI) module 1850.

The communication device 1800 is shown as having the configuration illustrated in FIG. 18, for the convenience of description. Some modules may be added to or omitted from the communication apparatus 1800. In addition, a module of the communication apparatus 1800 may be divided into more modules. The processor 1810 is configured to perform operations according to the embodiments of the present invention described before with reference to the drawings. Specifically, for detailed operations of the processor 1810, the descriptions of FIGS. 1 to 17 may be referred to.

The memory 1820 is connected to the processor 1810 and stores an Operating System (OS), applications, program codes, data, etc. The RF module 1830, which is connected to the processor 1810, upconverts a baseband signal to an RF signal or downconverts an RF signal to a baseband signal. For this purpose, the RF module 1830 performs digital-to-analog conversion, amplification, filtering, and frequency upconversion or performs these processes reversely. The display module 1840 is connected to the processor 1810 and displays various types of information. The display module 1840 may be configured as, not limited to, a known component such as a Liquid Crystal Display (LCD), a Light Emitting Diode (LED) display, and an Organic Light Emitting Diode (OLED) display. The UI module 1850 is connected to the processor 1810 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the aforementioned method for configuring a reference signal for multi-antenna-based beamforming in a wireless communication system and the device for the same have been described based on an example applied to the 3GPP LTE system, the method and device may be applied to various wireless communication systems in addition to the 3GPP LTE system. In addition, although the present invention is intended for massive antennas, the present invention may be applied to another antenna structure.

What is claimed is:

1. A method for transmitting a reference signal to a user equipment at a base station in a wireless communication system, the method comprising:
   determining a reference signal resource interval expressed in a unit of one or more resource blocks (RBs) and an offset value indicating an index of a resource block in which the reference signal resource is configured firstly;
   configuring reference signal resources for a downlink bandwidth defined by a plurality of RBs in accordance with the reference signal resource interval and the offset value; and
   transmitting the reference signal to the user equipment by using the configured reference signal resources,
   wherein configuring the reference signal resources comprises configuring the reference signal resources in accordance with the following Equation A:

$$k = M \times m + O, \quad \text{<Equation A>}$$

(where k is an index of the resource block in which the reference signal resource is configured, M is the reference signal resource interval, O represents the offset value, and m represents an index of the reference signal resources).

2. The method according to claim 1, further comprising:
   transmitting information on the offset value to the user equipment,
   wherein the offset value is based on at least one of cell identity (ID) or a subframe number in which the reference signal is transmitted.

3. The method according to claim 1, wherein m has a value of 0 to $N_{RB}-1$, and $N_{RB}$ is a total number of the reference signal resource and is determined based on the downlink bandwidth.

4. The method according to claim 3, wherein $N_{RB}$ is configured in accordance with the following Equation B:

$$N_{RB} = \lfloor N_{RB}^{DL}/M \rfloor \quad \text{<Equation B>}$$

(where $N_{RB}^{DL}$ represents the downlink bandwidth).

5. The method according to claim 3, wherein $N_{RB}$ is configured in accordance with the following Equation C:

$$N_{RB} = \lfloor N_{RB}^{DL}/M \rfloor + I\left(O + M\left\lfloor \frac{N_{RB}^{DL}}{M} \right\rfloor\right) \quad \text{< Equation C >}$$

(where I(x) represents a function, which has a value of 1 if x is smaller than $N_{RB}^{DL}$ and has a value of 0 if x is greater than $N_{RB}^{DL}$, and $N_{RB}^{DL}$ represents the downlink bandwidth).

* * * * *